(12) United States Patent
Chai

(10) Patent No.: US 8,242,220 B2
(45) Date of Patent: Aug. 14, 2012

(54) COPOLYMERS AND FILMS THEREOF

(75) Inventor: Choon Kool Chai, Overijse (BE)

(73) Assignee: Ineos Europe Limited, Hampshire (GB)

( * ) Notice: Subject to any disclaimer, the term of this patent is extended or adjusted under 35 U.S.C. 154(b) by 217 days.

(21) Appl. No.: 12/312,963

(22) PCT Filed: Dec. 11, 2007

(86) PCT No.: PCT/EP2007/063670
§ 371 (c)(1),
(2), (4) Date: Jun. 19, 2009

(87) PCT Pub. No.: WO2008/074689
PCT Pub. Date: Jun. 26, 2008

(65) Prior Publication Data
US 2010/0068488 A1 Mar. 18, 2010

(30) Foreign Application Priority Data

Dec. 21, 2006 (EP) .................................... 06256492

(51) Int. Cl.
*C08F 210/16* (2006.01)
*C08F 4/6592* (2006.01)
*C08J 5/18* (2006.01)

(52) U.S. Cl. ........ 526/126; 526/129; 526/134; 526/160; 526/161; 526/170; 526/172; 526/348; 526/348.1; 526/348.2; 526/348.5; 526/348.6

(58) Field of Classification Search .................. 526/126, 526/129, 134, 160, 161, 170, 172, 348, 348.1, 526/348.2, 348.5, 348.6
See application file for complete search history.

(56) References Cited

FOREIGN PATENT DOCUMENTS

| EP | 0 416 815 A2 | | 3/1991 |
|---|---|---|---|
| EP | 1 360 213 B1 | | 5/2006 |
| WO | WO 93/08221 | | 4/1993 |
| WO | WO 00/68285 A1 | | 11/2000 |
| WO | WO 2005/019333 A1 | | 3/2005 |
| WO | WO 2006/085051 | * | 8/2006 |
| WO | WO 2006/085051 A1 | | 8/2006 |

OTHER PUBLICATIONS

PCT International Report on Patentability; International Application No. PCT/EP2007/063670; Int'l Filing Date Dec. 11, 2007 (7 pgs)., Jun. 2009.

* cited by examiner

*Primary Examiner* — Roberto Rabago
(74) *Attorney, Agent, or Firm* — Nixon & Vanderhye

(57) ABSTRACT

Copolymer of ethylene and an alpha-olefin having (a) a density in the range 0.900-0.940 g/cm$^3$, (b) a melt index $MI_2$ (2.16 kg, 190° C.) in the range of 0.01-50 g/10 min, (c) a molecular weight distribution (Mw/Mn) in the range 3.5 to 4.5, and (d) a melt elastic modulus G'(G"=500 Pa) in the range 40 to 150 Pa. The copolymer has a melt index $MI_2$ (2.16 kg, 190° C.) Dow Rheology Index (DRI) and melt elastic modulus G'(G"=500 Pa) satisfying the equations of $[DRI/MI_2]>0$ and $[DRI/MI_2]<0.0225G'-0.745$.

25 Claims, No Drawings

COPOLYMERS AND FILMS THEREOF

This application is the U.S. National Phase of International Application PCT/EP2007/063670, filed 11 Dec. 2007, which designated the U.S. PCT/EP2007/063670 claims priority to European Application No. 06256492.7 filed 21 Dec. 2006. The entire content of these applications are incorporated herein by reference.

The present invention relates to novel copolymers and in particular to novel copolymers of ethylene and alpha-olefins in particular to linear low density polyethylenes (LLDPE) and also to films produced from said copolymers.

In recent years there have been many advances in the production of polyolefin copolymers due to the introduction of metallocene catalysts. Metallocene catalysts offer the advantage of generally higher activity than traditional Ziegler catalysts and are usually described as catalysts which are single-site in nature. Because of their single-site nature the polyolefin copolymers produced by metallocene catalysts often are quite uniform in their molecular structure. For example, in comparison to traditional Ziegler produced materials, they have relatively narrow molecular weight distributions (MWD) and narrow Short Chain Branching Distribution (SCBD).

Although certain properties of metallocene products are enhanced by narrow MWD, difficulties are often encountered in the processing of these materials into useful articles and films relative to Ziegler produced materials. In addition, the uniform nature of the SCBD of metallocene produced materials does not readily permit certain structures to be obtained.

Recently a number of patents have published directed to the preparation of films based on low density polyethylenes prepared using metallocene catalyst compositions.

EP 608369 describes copolymers having a melt flow ratio $(I_{10}/I_2)$ of $\geq 5.63$ and a molecular weight distribution (MWD) satisfying the relationship MWD$\leq (I_{10}/I_2)$–4.63. The copolymers are described as elastic substantially linear olefin polymers having improved processability and having between 0.01 to 3 long chain branches per 1000 C atoms and show the unique characteristic wherein the $I_{10}/I_2$ is essentially independent of MWD.

WO 94/14855 discloses linear low density polyethylene (LLDPE) films prepared using a metallocene, alumoxane and a carrier. The metallocene component is typically a bis(cyclopentadienyl) zirconium complex exemplified by bis(n-butylcyclopentadienyl) zirconium dichloride and is used together with methyl alumoxane supported on silica. The LLDPE's are described in the patent as having a narrow Mw/Mn of 2.5-3.0, a melt flow ratio (MFR) of 15-25 and low zirconium residues.

WO 94/26816 also discloses films prepared from ethylene copolymers having a narrow composition distribution. The copolymers are also prepared from traditional metallocenes (eg bis(1-methyl, 3-n-butylcyclopentadienyl) zirconium dichloride and methylalumoxane deposited on silica) and are also characterised in the patent as having a narrow Mw/Mn values typically in the range 3-4 and in addition by a value of Mz/Mw of less than 2.0.

However, it is recognised that the polymers produced from these types of catalyst system have deficiencies in processability due to their narrow Mw/Mn. Various approaches have been proposed in order to overcome this deficiency. An effective method to regain processability in polymers of narrow Mw/Mn is by the use of certain catalysts which have the ability to incorporate long chain branching (LCB) into the polymer molecular structure. Such catalysts have been well described in the literature, illustrative examples being given in WO 93/08221 and EP-A-676421.

WO 97/44371 discloses polymers and films where long chain branching is present and the products have a particularly advantageous placement of the comonomer within the polymer structure. Polymers are exemplified having both narrow and broad Mw/Mn, for example from 2.19 up to 6.0, and activation energy of flow, which is an indicator of LCB, from 7.39 to 19.2 kcal/mol (31.1 to 80.8 kJ/mol). However, there are no examples of polymers of narrow Mw/Mn, for example less than 3.4, which also have a low or moderate amount of LCB, as indicated by an activation energy of flow less than 11.1 kcal/mol (46.7 kJ/mol).

WO 00/68285 exemplified copolymers of ethylene and alpha-olefins having molecular weight distributions in the range 2.3 to 3.2, melt index of 1.02-1.57 and activation energies of about 32 kJ/mol. The copolymers were most suitable for use in the application of films showing good processability, improved optical and mechanical properties and good heat sealing properties. The copolymers were suitably prepared in the gas phase by use of monocyclopentadienyl metallocene complexes.

EP 1360213 describes metallocene film resins having good mechanical properties, excellent optical properties and very good extrusion potential. The resins exhibit melt indices $MI_2$ the range 0.001 to 150 g/10 min and a high Dow Rheology Index (DRI) of at least $20/MI_2$. The resins are suitably prepared from ethylene bis(4,5,6,7-tetrahydro-1-indenyl) zirconium dichloride/MAO catalyst systems.

EP 1260540 and EP 1225201 similarly disclose polymers having DRI of at least $8/MI_2$ and $5/MI_2$ respectively.

U.S. Pat. No. 5,674,342 describes ethylene polymers having a DRI of at least 0.1 and preferably at least 0.3 and a melt flow ratio $(I_{10}/I_2)$ in the range 8 to about 12. Specifically exemplified polymers exhibit DRI in the range 0.3-0.7 and molecular weight distributions (Mw/Mn) in the range 2.15-3.4.

Our earlier publication WO 06/085051 described copolymers of ethylene and alpha-olefins having broader molecular weight distributions (Mw/Mn) in the range 3.5 to 4.5. These copolymers exhibited a melt elastic modulus G'(G"=500 Pa) in the range 40 to 150 Pa and an activation energy of flow (Ea) in the range 28-45 kJ/mol but which had low or moderate amounts of LCB.

We have now developed novel copolymers of ethylene and alpha-olefins having a much lower Dow Rheology Index (DRI) but with a more balanced processability with improved properties particularly those suitable for preparing films with an excellent balance of processing, optical and mechanical properties.

Thus according to a first aspect of the present invention there is provided a copolymer of ethylene and an alpha-olefin, said copolymer having
 (a) a density in the range 0.900-0.940 g/cm³,
 (b) a melt index $MI_2$ (2.16 kg, 190° C.) in the range of 0.01-50 g/10 min,
 (c) a molecular weight distribution (Mw/Mn) in the range 3.5 to 4.5,
 (d) a melt elastic modulus G'(G"=500 Pa) in the range 40 to 150 Pa, and
 (e) a melt index $MI_2$ (2.16 kg, 190° C.), Dow Rheology Index (DRI), and melt elastic modulus G'(G"=500 Pa) satisfying the equations of $[DRI/MI_2]>0$ and $[DRI/MI_2]<0.0225 G'-0.745$ Particularly preferred copolymers of ethylene and an alpha-olefin are copolymers having
(a) a density in the range 0.900-0.940 g/cm³,
(b) a melt index $MI_2$ (2.16 kg, 190° C.) in the range of 0.01-50 g/10 min,
(c) a molecular weight distribution (Mw/Mn) in the range 3.5 to 4.5,
(d) a melt elastic modulus G'(G"=500 Pa) in the range 40 to 150 Pa, and
(e) a melt index $MI_2$ (2.16 kg, 190° C.), Dow Rheology Index (DRI), and melt elastic modulus G'(G"=500 Pa) satisfying the equations of $$[DRI/MI_2]>0 \text{ and } [DRI/MI_2]<0.0197G'-0.62$$

The copolymers preferably have a density in the range 0.915-0.930 g/cm³.

The copolymers preferably have a melt index in the range 0.05-20 g/10 min and most preferably in the range 0.5-5 g/10 min.

The copolymers preferably have a melt elastic modulus G'(G"=500 Pa) in the range 40-80 Pa.

Preferred alpha-olefins are those having C4-C12 carbon atoms. Most preferred alpha-olefins are 1-butene, 1-hexene, 4-methyl-1-pentene and 1-octene.

The preferred alpha-olefin is 1-hexene.

The novel copolymers of the present invention contain a small amount of long chain branching which may also be demonstrated by a value of the long chain branching parameter g' of <1.0. The parameter g' may suitably be calculated from gel permeation chromatography (GPC) on-line viscometry data. Details of the long chain branching parameter g' may be found in our earlier publication EP 1045868 the relevant parts of which are incorporated herein by reference.

Polymers prepared using traditional Ziegler Natta catalysts are linear polymers and exhibit a g' value equal to 1.

The novel copolymers of the present invention may also be suitably defined by the relationship between the Dow Rhelology Index (DRI) and the melt elastic modulus G'(G"=500 Pa) wherein $$DRI>0 \text{ and } DRI<0.0225G'-0.705$$

Thus according to another aspect of the present invention there is provided a copolymer of ethylene and an alpha-olefin, said copolymer having
(a) a density in the range 0.900-0.940 g/cm³,
(b) a melt index $MI_2$ (2.16 kg, 190° C.) in the range of 0.01-50 g/10 min,
(c) a molecular weight distribution (Mw/Mn) in the range 3.5 to 4.5,
(d) a melt elastic modulus G'(G"=500 Pa) in the range 40 to 150 Pa, and
(e) a Dow Rheology Index (DRI) and melt elastic modulus G'(G"=500 Pa) satisfying the equations of $$DRI>0 \text{ and } DRI<0.0225G'-0.705$$

The novel copolymers of the present invention may suitably be prepared by use of a metallocene catalyst system comprising, preferably a monocylcopentadienyl metallocene complex having a 'constrained geometry' configuration together with a suitable activator.

Examples of monocyclopentadienyl or substituted monocyclopentadienyl complexes suitable for use in the present invention are described in EP 416815, EP 418044, EP 420-436 and EP 551277.

Suitable complexes may be represented by the general formula:

$$CpMX_n$$

wherein Cp is a single cyclopentadienyl or substituted cyclopentadienyl group optionally covalently bonded to M through a substituent, M is a Group VIA metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Preferred monocyclopentadienyl complexes have the formula:

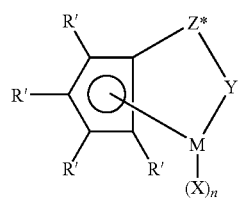

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is $SiR^*_2$, $CR^*_2$, $SiR^*_2SIR^*_2$, $CR^*_2CR^*_2$, $CR^*=CR^*$, $CR^*_2SiR^*_2$, or $GeR^*_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido) dimethyl(tetramethyl-$\eta^5$-cyclopentadienyl)silanetitanium dichloride and (2-methoxyphenylamido) dimethyl(tetramethyl-$\eta^5$-cyclopentadienyl)silanetitanium dichloride.

Particularly preferred metallocene complexes for use in the preparation of the copolymers of the present invention may be represented by the general formula:

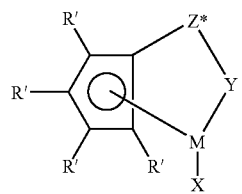

wherein:

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π-complex with M;

Y is —O—, —S—, —NR*—, —PR*—,

M is titanium or zirconium in the +2 formal oxidation state;

Z* is $SiR*_2$, $CR*_2$, $SiR*_2SiR*_2$, $CR*_2CR*_2$, $CR*=CR*$, $CR*_2SiR*_2$, or $GeR*_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene; s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R")— or —P(R")— wherein R" is $C_{1-10}$ hydrocarbyl.

Most preferred complexes are amidosilane- or amidoalkanediyl complexes.

Most preferred complexes are those wherein M is titanium.

Specific complexes are those disclosed in WO 95/00526 and are incorporated herein by reference.

A particularly preferred complex is (t-butylamido)(tetramethyl-$\eta^5$-cyclopentadienyl)dimethyl silanetitanium-$\eta^4$-1.3-pentadiene.

Suitable cocatalysts for use in the preparation of the novel copolymers of the present invention are those typically used with the aforementioned metallocene complexes.

These include aluminoxanes such as methyl aluminoxane (MAO), boranes such as tris(pentafluorophenyl) borane and borates.

Aluminoxanes are well known in the art and preferably comprise oligomeric linear and/or cyclic alkyl aluminoxanes. Aluminoxanes may be prepared in a number of ways and preferably are prepare by contacting water and a trialkylaluminium compound, for example trimethylaluminium, in a suitable organic medium such as benzene or an aliphatic hydrocarbon.

A preferred aluminoxane is methyl aluminoxane (MAO).

Other suitable cocatalysts are organoboron compounds in particular triarylboron compounds. A particularly preferred triarylboron compound is tris(pentafluorophenyl) borane.

Other compounds suitable as cocatalysts are compounds which comprise a cation and an anion. The cation is typically a Bronsted acid capable of donating a proton and the anion is typically a compatible non-coordinating bulky species capable of stabilizing the cation.

Such cocatalysts may be represented by the formula:

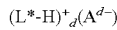

wherein:

L* is a neutral Lewis base $(L*-H)^+_d$ is a Bronsted acid $A^{d-}$ is a non-coordinating compatible anion having a charge of d−, and d is an integer from 1 to 3.

The cation of the ionic compound may be selected from the group consisting of acidic cations, carbonium cations, sylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N,N-dialkylanilinium cations such as N,N-dimethylanilinium cations.

The preferred ionic compounds used as cocatalysts are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate.

A preferred type of cocatalyst suitable for use with the metallocene complexes comprise ionic compounds comprising a cation and an anion wherein the anion has at least one substituent comprising a moiety having an active hydrogen.

Suitable cocatalysts of this type are described in WO 98/27119 the relevant portions of which are incorporated herein by reference.

Examples of this type of anion include:
triphenyl(hydroxyphenyl)borate
tri(p-tolyl)(hydroxyphenyl)borate
tris(pentafluorophenyl)(hydroxyphenyl)borate
tris(pentafluorophenyl)(4-hydroxyphenyl)borate Examples of suitable cations for this type of cocatalyst include triethylammonium, triisopropylammonium, diethylmethylammonium, dibutylethylammonium and similar.

Particularly suitable are those cations having longer alkyl chains such as dihexyldecylmethylammoniurn, dioctadecylmethylammonium, ditetradecylmethylammonium, bis(hydrogentated tallow alkyl)methylammonium and similar.

Particular preferred cocatalysts of this type are alkylammonium tris(pentafluorophenyl) 4-(hydroxyphenyl)borates. A particularly preferred cocatalyst is bis(hydrogenated tallow alkyl)methyl ammonium tris(pentafluorophenyl)(4-hydroxyphenyl)borate.

With respect to this type of cocatalyst, a preferred compound is the reaction product of an alkylammonium tris(pentafluorophenyl)-4-(hydroxyphenyl)borate and an organometallic compound, for example triethylaluminium or an aluminoxane such as tetraisobutylaluminoxane.

The catalysts used to prepare the novel copolymers of the present invention may suitably be supported.

Suitable support materials include inorganic metal oxides or alternatively polymeric supports may be used for example polyethylene, polypropylene, clays, zeolites, etc.

The most preferred support material for use with the supported catalysts according to the method of the present invention is silica. Suitable silicas include Ineos ES70 and Grace Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The porous supports are preferably pretreated with an organometallic compound preferably an organoaluminium compound and most preferably a trialkylaluminium compound in a dilute solvent.

The support material is pretreated with the organometallic compound at a temperature of −20° C. to 150° C. and preferably at 20° C. to 100° C.

Particularly suitable catalysts for use in the preparation of the copolymers of the present invention are metallocene complexes which have been treated with polymerisable monomers. Our earlier applications WO 04/020487 and WO 05/019275 describe supported catalyst compositions wherein a polymerisable monomer is used in the catalyst preparation.

Polymerisable monomers suitable for use in this aspect of the present invention include ethylene, propylene, 1-butene, 1-hexene, 1-octene, 1-decene, styrene, butadiene, and polar monomers for example vinyl acetate, methyl methacrylate, etc. Preferred monomers are those having 2 to 10 carbon atoms in particular ethylene, propylene, 1-butene or 1-hexene.

Alternatively a combination of one or more monomers may be used for example ethylene and 1-hexene.

The preferred polymerisable monomer is 1-hexene.

The polymerisable monomer is suitably used in liquid form or alternatively may be used in a suitable solvent. Suitable solvents include for example heptane.

The polymerisable monomer may be added to the cocatalyst before addition of the metallocene complex or alternatively the complex may be pretreated with the polymerisable monomer.

The novel copolymers of the present invention may suitably be prepared in processes performed in either the slurry or the gas phase.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

The novel copolymers are most suitably prepared in a gas phase process.

Gas phase processes for the polymerisation of olefins, especially for the homopolymerisation and the copolymerisation of ethylene and α-olefins for example 1-butene, 1-hexene, 4-methyl-1-pentene are well known in the art.

Typical operating conditions for the gas phase are from 20° C. to 100° C. and most preferably from 40° C. to 85° C. with pressures from subatmospheric to 100 bar.

Preferred gas phase processes are those operating in a fluidised bed. Particularly preferred gas phase processes are those operating in "condensed mode" as described in EP 89691 and EP 699213 the latter being a particularly preferred process.

By "condensed mode" is meant the "process of purposefully introducing a recycle stream having a liquid and a gas phase into a reactor such that the weight percent of liquid based on the total weight of the recycle stream is typically greater than about 2.0 weight percent".

The novel copolymers of the present invention may be suitably prepared by the copolymerisation of ethylene with alpha-olefins.

The preferred alpha-olefins are 1-butene, 1-hexene, 4-methyl-1-pentene and 1-octene. The most preferred alpha-olefin is 1-hexene.

Thus according to another aspect of the present invention there is provided a method for the preparation of copolymers of ethylene and alpha-olefins having (a) a density in the range 0.900-0.940 g/cm$^3$,
(b) a melt index $MI_2$ (2.16 kg, 190° C.) in the range of 0.01-50 g/10 min,
(c) a molecular weight distribution (Mw/Mn) in the range 3.5 to 4.5,
(d) a melt elastic modulus G'(G"=500 Pa) in the range 40 to 150 Pa, and
(e) a melt index $MI_2$ (2.16 kg, 190° C.), Dow Rheology Index (DRI), and melt elastic modulus G'(G"=500 Pa) satisfying the equations of $$[DRI/MI_2]>0 \text{ and } [DRI/MI_2]<0.0225G'-0.745$$

said method comprising copolymerising ethylene and said alpha olefins in the presence of a catalyst system as hereinbefore described.

It is a particular advantage of the novel copolymers of the present invention that there is an excellent balance between the degree of long chain branching as indicated by the Dow Rheology Index (DRI) and the melt elasticity (G') which is a function of both long chain branching and molecular weight distribution. This balance results in an advantageous combination of desired properties particularly when directed to film applications.

The novel copolymers are therefore particularly suitable for the production of films and sheets prepared using traditional methods well known in the art. Examples of such methods are film blowing, film casting and orientation of the partially crystallised product. The films exhibit good processability, improved optical and mechanical properties and good heat sealing properties.

The films in particular exhibit an excellent combination of dart impact, low haze and high gloss.

The films typically exhibit a haze ranging from 3 to 20 and a dart impact (25 μm film)>500 g, preferably >1000 g and most preferably >1500 g.

The films preferably exhibit a haze of <10% and a gloss of >60%.

The films also typically exhibit a melt pressure in the range 150-250 bar and preferably in the range 160-190 bar when extruded under the specified extrusion film blowing conditions with a CMG film blowing processing line.

The films may be suitable for a number of applications for example industrial, retail, food packaging, non-food packaging and medical applications. Examples include films for bags, garment bags, grocery sacks, merchandise bags, selfserve bags, grocery wet pack, food wrap, pallet stretch wrap, bundling and overwrap, industrial liners, refuse sacks, heavy duty bags, agricultural films, diaper liners, etc.

The films may be utilised as shrink film, cling film, stretch film, sealing film or other suitable type of film.

The novel copolymers of the present invention are particularly suitable for use in the manufacture of blown films.

Thus according to another aspect of the present invention there is provided a film comprising a copolymer of ethylene and an alpha-olefin having
(a) a density in the range 0.900-0.940 g/cm$^3$,
(b) a melt index MI$_2$ (2.16 kg, 190° C.) in the range of 0.01-50 g/10 min,
(c) a molecular weight distribution (Mw/Mn) in the range 3.5 to 4.5,
(d) a melt elastic modulus G'(G"=500 Pa) in the range 40 to 150 Pa, and
(e) a melt index MI$_2$ (2.16 kg, 190° C.), Dow Rheology Index (DRI), and melt elastic modulus G'(G"=500 Pa) satisfying the equations of $$[DRI/MI_2]>0 \text{ and } [DRI/MI_2]<0.0225G'-0.745$$

Particularly preferred films are those having a dart impact (25 μm film)>1000 g, a haze <10% and a gloss of >60%, said film comprising a copolymer of ethylene and an alpha-olefin having
(a) a density in the range 0.900-0.940 g/cm$^3$,
(b) a melt index MI$_2$ (2.16 kg, 190° C.) in the range of 0.01-50 g/10 min,
(c) a molecular weight distribution (Mw/Mn) in the range 3.5 to 4.5,
(d) a melt elastic modulus G'(G"=500 Pa) in the range 40 to 150 Pa, and
(e) a melt index MI$_2$ (2.16 kg, 190° C.), Dow Rheology Index (DRI), and melt elastic modulus G'(G"=500 Pa) satisfying the equations of $$[DRI/MI_2]>0 \text{ and } [DRI/MI_2]<0.0225G'-0.745$$

Thus according to another aspect of the present invention there is provided films prepared by use of metallocene catalyst systems, said films having a dart impact (25 μm film) >1000 g, a haze <10%, a gloss of >60% and a melt pressure in the range 150-250 bar when extruded under the specified film blowing conditions with a CMG film blowing processing line.

Preferred films are those having a dart impact >1500 g.

The present invention will now be further illustrated with reference to the following examples:

EXAMPLE 1

Catalyst Preparation

(a) Treatment of Silica with Triethylaluminium (TEA)

Under continuous agitation, 1678 L of isohexane and 499 kg of silica D948 (available from W.R. Grace), were added to a reactor. (The silica had been previously calcined under nitrogen to reach a level of hydroxyl groups of 1.50 mmol/g). 24.3 kg of an octastat 2000 (available from Octel) solution in pentane (2 g/l) was then added and the mixture was stirred for 15 minutes. 853 kg of a 12% triethylaluminium (TEA) solution in isohexane was then slowly added over 1 hour and the mixture was stirred for 1 hour further at 30° C.

The slurry was filtered and thoroughly washed with isohexane before being transferred to a dryer. 24.3 kg of an octastat 2000 solution in pentane (2 g/l) was added and the mixture was finally dried at 60° C. under vacuum.

The aluminium content of the solid was 3.48 wt %.

(b) Preparation of Catalyst Component 1

To 337 kg of a 10.72% solution of [N(H)Me(C$_{18-22}$H$_{37-45}$)$_2$][B(C$_6$F$_5$)$_3$(p-OHC$_6$H$_4$)] in toluene were added over 15 minutes 31.4 kg of 12% TEA solution in isohexane. The mixture was further stirred for 15 minutes to yield a solution of catalyst component 1.

(c) Preparation of a Mixture of (C$_5$Me$_4$SiMe$_2$N$^t$Bu)Ti($\eta^4$-1,3-pentadiene) with 1-hexene To 109.5 kg of a 9.94% solution of (C$_5$Me$_4$SiMe$_2$N$^t$Bu)Ti($\eta^4$-1,3-pentadiene) in heptane were added 83 kg of 1-hexene.

(d) Preparation of the Supported Catalyst 499 kg of the above prepared silica/TEA was introduced into a reactor.

The above prepared solution of catalyst component 1 was fed to the reactor over 45 minutes and the mixture was then stirred for further 30 minutes The contents of the reactor were then cooled to 15° C. and the above prepared solution of (C$_5$Me$_4$SiMe$_2$N$^t$Bu)Ti($\eta^4$-1,3-pentadiene) and 1-hexene was fed over a period of 40 minutes, and then the mixture was further stirred for 2.5 hour. During the addition the internal temperature increased to a maximum of 26° C.

57.6 kg of an octastat 2000 solution in pentane (2 g/l) was then added and the mixture was dried at 45° C. for 27 hours until the residual solvent content in the catalyst was <1%. Analysis of the resulting dry powder showed the titanium content to be 46.2 μmol/g, the boron content to be 48 μmol/g and the aluminium content to be 2.92 wt %.

EXAMPLE 2

The catalyst preparation was the same as for Example 1 except that the final mixture was dried at 60° C. for 15 hours.

Analysis of the resulting dry powder showed the titanium content to be 46.6 μmmol/g, the boron content to be 49 mmol/g and the aluminium content to be 2.92 wt %.

EXAMPLE 3

(a) Treatment of Silica with TEA

Under continuous agitation, 1370 L of isohexane and 407 kg of silica D948 (available from W.R. Grace), were added to a reactor. (The silica had been previously calcined under nitrogen to reach a level of hydroxyl groups of 1.50 mmol/g). 19.8 kg of an octastat 2000 (available from Octel) solution in pentane (2 g/l) was then added and the mixture was stirred for 15 minutes. 696 kg of a 12% TEA solution in isohexane was then slowly added over 1 hour and the mixture was stirred for 1 hour further at 30° C.

The slurry was filtered and thoroughly washed with isohexane before being transferred to a dryer. 19.8 kg of an octastat 2000 solution in pentane (2 g/l) was added and the mixture was finally dried at 60° C. under vacuum.

The aluminium content of the solid was 3.52 wt %.

(b) Preparation of Catalyst Component 1

To 391 kg of a 9.24% solution of [N(H)Me(C$_{18-22}$H$_{37-45}$)$_2$][B(C$_6$F$_5$)$_3$(p-OHC$_6$H$_4$)] in toluene were added over 15 minutes 30 kg of 12% TEA solution in isohexane. The mixture was further stirred for 15 minutes to yield a solution of catalyst component 1.

(c) Preparation of a Mixture of $(C_5Me_4SiMe_2N^tBu)$ $Ti(\eta^4$-1,3-pentadiene) with 1-hexene To 97.6 kg of a 10.55% solution of $(C_5Me_4SiMe_2N^tBu)Ti$ $(\eta^4$-1,3-pentadiene) in heptane were added 82.9 kg of 1-hexene.

(d) Preparation of the Supported Catalyst 458 kg of the above prepared silica/TEA was introduced into a reactor.

The above prepared solution of catalyst component 1 was fed to the reactor over 45 minutes and the mixture was then stirred for further 30 minutes.

The contents of the reactor were then cooled to 15° C. and the above prepared solution of $(C_5Me_4SiMe_2N^tBu)Ti(\eta^4$-1, 3-pentadiene) and 1-hexene was fed over a period of 40 minutes, and then the mixture was further stirred for 1 hour. During the addition the internal temperature increased to a maximum of 21° C.

12 kg of octastat 2000 was then added and the mixture was dried at 45° C. for 27 hours until the residual solvent content in the catalyst was <1%. Analysis of the resulting dry powder showed the titanium content to be 46.5 µmol/g, the boron content to be 51 µmol/g and the aluminium content to be 2.79 wt %.

EXAMPLE 4

(a) Treatment of Silica with TEA

Under continuous agitation, 1430 L of isohexane and 425 kg of silica D948 (available from W.R. Grace), were added to a reactor. (The silica had been previously calcined under nitrogen to reach a level of hydroxyl groups of 1.50 mmol/g). 20.7 kg of an octastat 2000 (available from Octel) solution in pentane (2 g/l) was then added and the mixture was stirred for 15 minutes. 727 kg of a 12% TEA solution in isohexane was then slowly added over 1 hour and the mixture was stirred for 1 hour further at 30° C.

The slurry was filtered and thoroughly washed with isohexane before being transferred to a dryer. 20.7 kg of an octastat 2000 solution in pentane (2 g/l) was added and the mixture was finally dried at 60° C. under vacuum.

The aluminium content of the solid was 3.45 wt %.

(b) Preparation of Catalyst Component 1

To 333 kg of a 9.24% solution of $[N(H)Me(C_{18-22}H_{37-45})_2][B(C_6F_5)_3(p$-$OHC_6H_4)]$ in toluene were added over 15 minutes 25 kg of 12% TEA solution in isohexane. The mixture was further stirred for 15 minutes to yield a solution of catalyst component 1.

(c) Preparation of a Mixture of $(C_5Me_4SiMe_2N^tBu)$ $Ti(\eta^4$-1,3-pentadiene) with 1-hexene To 83 kg of a 10.55% solution of $(C_5Me_4SiMe_2N^tBu)Ti$ $(\eta^4$-1,3-pentadiene) in heptane were added 70.6 kg of 1-hexene.

(d) Preparation of the Supported Catalyst 477 kg of the above prepared silica/TEA was introduced into a reactor.

The above prepared solution of catalyst component 1 was fed to the reactor over 45 minutes and the mixture was then stirred for further 30 minutes The contents of the reactor were then cooled to 15° C. and the above prepared solution of $(C_5Me_4SiMe_2N^tBu)Ti(\eta^4$-1, 3-pentadiene) and 1-hexene was fed over a period of 40 minutes, and then the mixture was further stirred for 1 hour. During the addition the internal temperature increased to a maximum of 21° C.

12 kg of octastat 2000 was then added and the mixture was dried at 45° C. for 27 hours until the residual solvent content in the catalyst was <1%. Analysis of the resulting dry powder showed the titanium content to be 40.7 µmol/g, the boron content to be 42 µmol/g and the aluminium content to be 2.89 wt %.

Polymerization

Polymerization was carried out continuously using a fluidised bed gas phase reactor of 5 m diameter, with a vertical cylindrical section of 15.8 m. Polymerization conditions used are shown in Table 1 as follows:

TABLE 1

| | Example | | |
|---|---|---|---|
| Catalyst | 5<br>Example 3 | 6<br>Example 3 | 7<br>Example 4 |
| Reaction temp (° C.) | 75.99 | 76.01 | 76.00 |
| Reaction pressure (barg) | 19.09 | 19.08 | 19.08 |
| C2 partial pressure (bar) | 11.08 | 9.33 | 11.29 |
| H2 partial pressure (bar) | 0.03 | 0.03 | 0.03 |
| C6 partial pressure (bar) | 0.07 | 0.06 | 0.07 |
| C5 partial pressure (bar) | 1.69 | 2.40 | 2.40 |
| Residence time (hrs) | 11.00 | 7.76 | 7.52 |
| Condensation rate (wt %) | 0 | 4.2 | 5.8 |

Product Characteristics

The product characteristics are shown below in Table 2.

TABLE 2

| | Example 5 | Example 6 | Example 7 |
|---|---|---|---|
| Density (g/cm$^2$) | 0.9199 | 0.9213 | 0.9198 |
| MI$_2$ (2.16 kg/190° C.) | 1.17 | 1.37 | 1.15 |
| DRI | 0.256 | 0.321 | 0.233 |
| DRI/MI$_2$ | 0.219 | 0.234 | 0.203 |
| G' (G" = 500 Pa) Pa | 43.5 | 47.3 | 42.5 |
| [0.0225G'-0.745] | 0.235 | 0.320 | 0.211 |
| [0.0197G'-0.62] | 0.236 | 0.311 | 0.217 |
| [0.0225G'-0.705] | 0.273 | 0.359 | 0.251 |
| Mw/Mn | 3.7 | 4.0 | 3.8 |

COMPARATIVE EXAMPLES

The aforementioned WO 06/085051 described copolymers of ethylene and alpha-olefins having broader molecular weight distributions (Mw/Mn) in the range 3.5 to 4.5. These copolymers exhibited a melt elastic modulus G'(G"=500 Pa) in the range 40 to 150 Pa and an activation energy of flow (Ea) in the range 28-45 kJ/mol but which had low or moderate amounts of LCB. Table 3 reports the relationship between DRI and melt index for the copolymers prepared in examples 2-6 from this patent application (comparative examples CE2~CE6) and clearly shows that none of these copolymers satisfy the DRI/melt index and melt elastic modulus relationship of the copolymers of the present invention.

TABLE 3

| | Comparative Examples | | | | |
|---|---|---|---|---|---|
| | CE 2 | CE 3 | CE 4 | CE 5 | CE6 |
| Density (g/cm$^2$) | 0.9194 | 0.9191 | 0.9181 | 0.9187 | 0.9184 |
| MI$_2$ (2.16 kg/190° C.) | 1.2 | 1.1 | 0.95 | 1.28 | 1.17 |
| DRI | 0.898 | 1.152 | 2.118 | 1.142 | 0.797 |
| DRI/MI$_2$ | 0.748 | 1.047 | 2.229 | 0.892 | 0.681 |
| G'(G" = 500 Pa) Pa | 51 | 59 | 64 | 53 | 51 |
| [0.0225G'-0.745] | 0.403 | 0.583 | 0.695 | 0.448 | 0.403 |
| Mw/Mn | 3.8 | 3.9 | 3.8 | 3.9 | 3.7 |

Methods of Test

Melt index (190/2.16) was measured according to ISO 1133.

Density was measured using a density column according to ISO 1872/1 method except that the melt index extrudates were annealed in boiling water for 30 minutes. It was then cooled down in the water without further heating for 60 minutes. 2 samples were taken, washed with isopropanol and put in the density gradient column. The density value of the sample that sunk deeper was taken after 20 minutes.

Gel Permeation Chromatography Analysis for Molecular Weight Distribution Determination Apparent molecular weight distribution and associated averages, uncorrected for long chain branching, were determined by Gel Permeation Chromatography using a Waters 150CV, with 4 Waters HMW 6E columns and a differential refractometer detector. The solvent used was 1,2,4 Trichlorobenzene at 135° C., which is stabilised with BHT, of 0.2 g/liter concentration and filtered with a 0.45 µm Osmonics Inc. silver filter. Polymer solutions of 1.0 g/liter concentration were prepared at 160° C. for one hour with stirring only at the last 30 minutes. The nominal injection volume was set at 400 µl and the nominal flow rate was 1 ml/min.

A relative calibration was constructed using 13 narrow molecular weight linear polystyrene standards:

| PS Standard | Molecular Weight |
|---|---|
| 1 | 7520000 |
| 2 | 4290000 |
| 3 | 2630000 |
| 4 | 1270000 |
| 5 | 706000 |
| 6 | 355000 |
| 7 | 190000 |
| 8 | 114000 |
| 9 | 43700 |
| 10 | 18600 |
| 11 | 10900 |
| 12 | 6520 |
| 13 | 2950 |

The elution volume, V, was recorded for each PS standards. The PS molecular weight was then converted to PE equivalent using the following Mark Houwink parameters $k_{ps}$=1.21× 10$^{-4}$, $\square_{ps}$=0.707, $k_{pe}$=3.92×10$^{-4}$, $\square_{pe}$=0.725. The calibration curve Mw$_{PE}$=f(V) was then fitted with a first order linear equation. All the calculations are done with Millennium 3.2 software from Waters.

The very low molecular weight fractions (below 1000 Daltons) were routinely excluded in the calculation of number average molecular weight, Mn, and hence the polymer polydispersity, Mw/Mn, in order to improve integration at the low end of the molecular weight curve, leading to a better reproducibility and repeatability in the extraction and calculation these parameters.

Dynamic Rheological Analysis

To characterize the rheological behavior of substantially linear ethylene polymers, S Lai and G. W. Knight introduced (ANTEC '93 Proceedings, Insite (™) Technology Polyolefins (ITP)-New Rules in the Structure/Rheology Relationship of Ethylene &-Olefin Copolymers, New Orleans, La., May 1993) a new rheological measurement, the Dow Rheology Index (DRI) which expresses a polymer's "normalized relaxation time as the result of long chain branching". S. Lai et al; (Antec '94, Dow Rheology Index (DRI) for Insite (™) Technology Polyolefins (ITP): Unique structure-Processing Relationships, pp. 1814-1815) defined the DRI as the extent to which the rheology of ethylene-octene copolymers known as ITP (Dow's Insite Technology Polyolefins) incorporating long chain branches into the polymer backbone deviates from the rheology of the conventional linear homogeneous polyolefins that are reported to have no Long Chain Branches (LCB) by the following normalized equation:

$$DRI = [365000(\tau_0/\eta_0)-1]/10$$

wherein $\tau_0$ is the characteristic relaxation time of the material and $\eta_0$ is the zero shear viscosity of the material. The DRI is calculated by least squares fit of the rheological curve (dynamic complex viscosity versus applied frequency eg. 0.01-100 rads/s) as described in U.S. Pat. No. 6,114,486 with the following generalized Cross equation, i.e.

$$\eta(\omega)=\eta_0/[1+(\omega\tau_0)^n]$$

wherein n is the power law index of the material, $\eta(\omega)$ and $\omega$ are the measured complex viscosity and applied frequency data respectively.

Dynamic rheological measurements are carried out, according to ASTM D 4440, on a dynamic rheometer (e.g., ARES) with 25 mm diameter parallel plates in a dynamic mode under an inert atmosphere. For all experiments, the rheometer has been thermally stable at 190° C. for at least 30 minutes before inserting the appropriately stabilised (with anti-oxidant additives), compression-moulded sample onto the parallel plates. The plates are then closed with a positive normal force registered on the meter to ensure good contact. After about 5 minutes at 190° C., the plates are lightly compressed and the surplus polymer at the circumference of the plates is trimmed. A further 10 minutes is allowed for thermal stability and for the normal force to decrease back to zero. That is, all measurements are carried out after the samples have been equilibrated at 190° C. for about 15 minutes and are run under full nitrogen blanketing.

Two strain sweep (SS) experiments are initially carried out at 190° C. to determine the linear viscoelastic strain that would generate a torque signal which is greater than 10% of the lower scale of the transducer, over the full frequency (e.g. 0.01 to 100 rad/s) range. The first SS experiment is carried out with a low applied frequency of 0.1 rad/s. This test is used to determine the sensitivity of the torque at low frequency. The second SS experiment is carried out with a high applied frequency of 100 rad/s. This is to ensure that the selected applied strain is well within the linear viscoelastic region of the polymer so that the oscillatory rheological measurements do not induce structural changes to the polymer during testing. In addition, a time sweep (TS) experiment is carried out with a low applied frequency of 0.1 rad/s at the selected strain (as determined by the SS experiments) to check the stability of the sample during testing.

Measurement of Melt Elastic Modulus G'(G"=500 Pa) at 190° C.:

The frequency sweep (FS) experiment is then carried out at 190° C. using the above appropriately selected strain level and the dynamic rheological data thus measured are then analysed using the rheometer software (viz., Rheometrics RHIOS V4.4 or Orchestrator Software) to determine the melt elastic modulus G'(G"=500 Pa) at a constant, reference value (500 Pa) of melt viscous modulus (G").

Film Characteristics

Blown films of 25 µm thickness were prepared from the copolymers prepared in Examples 5 and 6. The details of extrusion conditions and the mechanical and optical properties of the films are given below in Table 5.

TABLE 5

| Copolymer | | Example 5 | Example 6 |
|---|---|---|---|
| annealed density (pellets) kg/cm$^3$ | | 921.3 | 919.9 |
| MI (2.16) g/10 min (pellets) | | 1.43 | 1.24 |
| extrusion parameters | | | |
| Melt pressure (bar) | | 163 | 184 |
| Melt temperature (° C.) | | 216 | 216 |
| Motor load (A) | | 70 | 76 |
| Screw speed (rpm) | | 54 | 54 |
| Air temperature (° C.) | | 18 | 18 |
| Specific output (calculated from Output/Motor load (kg/h/A)) | | 0.71 | 0.66 |
| mechanical properties | | | |
| dart impact (dart head) g | | 1550 | 1707 |
| Elmendorf tear strength (g/25 µm) | MD | 235 | 216 |
| | TD | 470 | 445 |
| Tensile stress at yield (MPa) | MD | 10.9 | 9.6 |
| | TD | 10.3 | 9.7 |
| Tensile stress at break (MPa) | MD | 64.9 | 66 |
| | TD | 60.8 | 60.5 |
| Elongation at break (%) (MPa) | MD | 588 | 566 |
| | TD | 697 | 669 |
| Secant modulus 1% (MPa) | MD | 164 | 155 |
| | TD | 168 | 166 |
| optical properties | | | |
| haze (%) | | 8.8 | 6 |
| gloss 45° (%) | | 62 | 69 |

Extruder & Extrusion Characteristics

Extruder:

| CMG (Costruzione Meccaniche Gallia) 1200 TSA | |
|---|---|
| Screw diameter | 55 mm |
| Screw L/D ratio | 30 |
| Die diameter/gap | 150/2.2 mm |
| Screen pack | flat |

Extrusion:

Temperature Profile:

| Screw | 200/210/210/210/210° C. |
|---|---|
| Die | 210/210/220/225° C. |
| Output | 50 kg/h |
| Take-off speed | 30 m/min |
| Blow-up ratio | 2.5:1 |
| Frostline height | 430 mm |
| Film thickness | 15 µm |

Dart impact was measured by ASTM D1709 (Method A), haze by ASTM D1003, gloss by ASTM D2457, tear strength by ASTM 1922 and tensile properties according to ISO 1084.

The invention claimed is:

1. A copolymer of ethylene and an alpha-olefin, said copolymer having
    (a) a density in the range 0.900-0.940 g/cm$^3$,
    (b) a melt index MI$_2$ (2.16 kg, 190° C.) in the range of 0.01-50 g/10 min,
    (c) a molecular weight distribution (Mw/Mn) in the range 3.5 to 4.5,
    (d) a melt elastic modulus G'(G"=500 Pa) in the range 40 to 150 Pa, and
    (e) a melt index MI$_2$ (2.16 kg, 190° C.) Dow Rheology Index (DRI) and melt elastic modulus G'(G"=500 Pa) satisfying the equations of $[DRI/MI_2]>0$ and $[DRI/MI_2]<0.0225G'-0.745$.

2. A copolymer of ethylene and an alpha-olefin, said copolymer having
    (a) a density in the range 0.900-0.940 g/cm$^3$,
    (b) a melt index MI$_2$ (2.16 kg, 190° C.) in the range of 0.01-50 g/10 min,
    (c) a molecular weight distribution (Mw/Mn) in the range 3.5 to 4.5,
    (d) a melt elastic modulus G'(G"=500 Pa) in the range 40 to 150 Pa, and
    (e) a melt index MI$_2$ (2.16 kg, 190° C.), Dow Rheology Index (DRI), and melt elastic modulus G'(G"=500 Pa) satisfying the equations of $[DRI/MI_2]>0$ and $[DRI/MI_2]<0.0197G'-0.62$.

3. A copolymer of ethylene and an alpha-olefin, said copolymer having
    (a) a density in the range 0.900-0.940 g/cm$^3$,
    (b) a melt index MI$_2$ (2.16 kg, 190° C.) in the range of 0.01-50 g/10 min,
    (c) a molecular weight distribution (Mw/Mn) in the range 3.5 to 4.5,
    (d) a melt elastic modulus G'(G"=500 Pa) in the range 40 to 150 Pa, and
    (e) a Dow Rheology Index (DRI) and melt elastic modulus G'(G"=500 Pa) satisfying the equations of $DRI>0$ and $DRI<0.0225G'-0.705$.

4. A copolymer according to claim 1 wherein the density is in the range 0.915-0.930 g/cm$^3$.

5. A copolymer according to claim 1 wherein the melt index is in the range 0.05-20 g/10 min.

6. A copolymer according claim 1 wherein the melt elastic modulus G'(G"=500 Pa) in the range 40-80 Pa.

7. A copolymer according to claim 1 wherein the alpha-olefin has 4-12 carbon atoms.

8. A copolymer according to claim 7 wherein the alpha-olefin is 1-hexene.

9. A process for the preparation of copolymers according to claim 1 comprising polymerizing ethylene and an alpha-olefin in the presence of a metallocene catalyst system.

10. A process according to claim 9 wherein the metallocene catalyst system comprises a monocyclopentadienyl metallocene complex.

11. A process according to claim 10 wherein the monocyclopentadienyl metallocene complex has the formula:

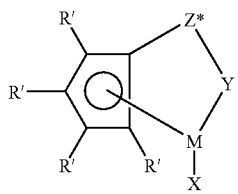

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;
X is a neutral $\eta^4$ bonded diene group having up to 30 non-hydrogen atoms, which forms a π-complex with M;
Y is —O—, —S—, —NR*—, —PR*—,
M is titanium or zirconium in the +2 formal oxidation state;
Z* is $SiR^*_2$, $CR^*_2$, $SiR^*_2SiR^*_2$, $CR^*_2CR^*_2$, $CR^*=CR^*$, $CR^*_2SiR^*_2$, or
$GeR^*_2$, wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

12. A process according to claim 9 wherein the metallocene catalyst system comprises a cocatalyst represented by the formula:

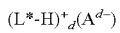

wherein:
L* is a neutral Lewis base,
$(L^*\text{-H})^+_d$ is a Bronsted acid,
$A^{d-}$ is a non-coordinating compatible anion having a charge of d−, and
d is an integer from 1 to 3.

13. A process according to claim 12 wherein the cocatalyst comprises an ionic compound comprising a cation and an anion wherein the anion has at least one substituent comprising a moiety having an active hydrogen.

14. A process according to claim 9 wherein the metallocene catalyst system is supported.

15. A process according to claim 14 wherein the support is silica.

16. A process according to claim 9 performed in the gas phase.

17. A process according to claim 16 performed in a fluidized bed reactor.

18. A process according to claim 16 wherein the polymerization process is performed in condensed mode operation.

19. A film comprising a copolymer of ethylene and an alpha-olefin having
(a) a density in the range 0.900-0.940 g/cm³,
(b) a melt index $MI_2$ (2.16 kg, 190° C.) in the range of 0.01-50 g/10 min,
(c) a molecular weight distribution (Mw/Mn) in the range 3.5 to 4.5,
(d) a melt elastic modulus G'(G"=500 Pa) in the range 40 to 150 Pa, and
(e) a melt index $MI_2$ (2.16 kg, 190° C.), Dow Rheology Index (DRI) and melt elastic modulus G'(G"=500 Pa) satisfying the equations of $$[DRI/MI_2]>0 \text{ and } [DRI/MI_2]<0.0225G'-0.745.$$

20. A film according to claim 19 having a dart impact (25 μm film)>1000g, a haze <10% and a gloss of >60%.

21. A film according to claim 19 having a melt pressure in the range 160-190 bar when extruded under the specified extrusion film blowing conditions with a CMG film blowing processing line.

22. A film comprising a copolymer of claim 1 prepared by use of a metallocene catalyst system, said film having a dart impact (25 μm film)>1000g, a haze <10%, a gloss of >60% and a melt pressure in the range 160-190 bar when extruded under the specified extrusion film blowing conditions with a CMG film blowing processing line.

23. A film according to claim 22 wherein the metallocene catalyst system comprises a monocyclopentadienyl metallocene complex.

24. A film according to claim 22 having a dart impact >1500 g.

25. A blown film according to claim 19, 20, 21, 22, 23 or 24.

* * * * *